April 5, 1949.  A. C. BESSERDICH ET AL  2,466,358
UNDER-SPEED TRIP FOR STEAM TURBINES
Filed May 30, 1945  2 Sheets-Sheet 1

Inventors:
Arnold C. Besserdich
Willard G. Roesch
By Pike H. Sullivan
Attorney

April 5, 1949.  A. C. BESSERDICH ET AL  2,466,358
UNDER-SPEED TRIP FOR STEAM TURBINES
Filed May 30, 1945  2 Sheets-Sheet 2
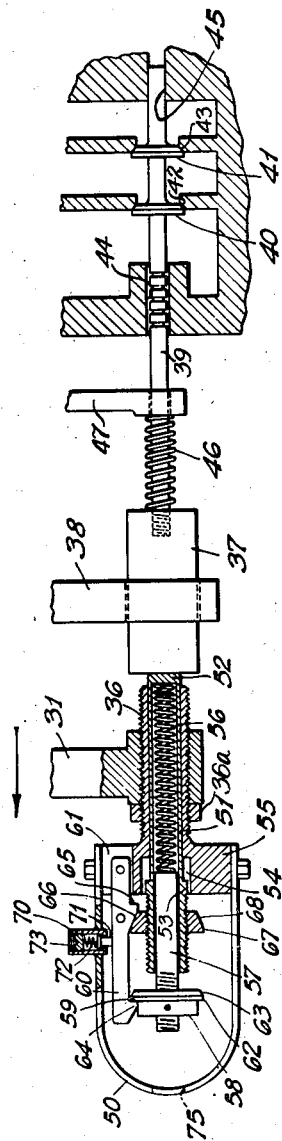
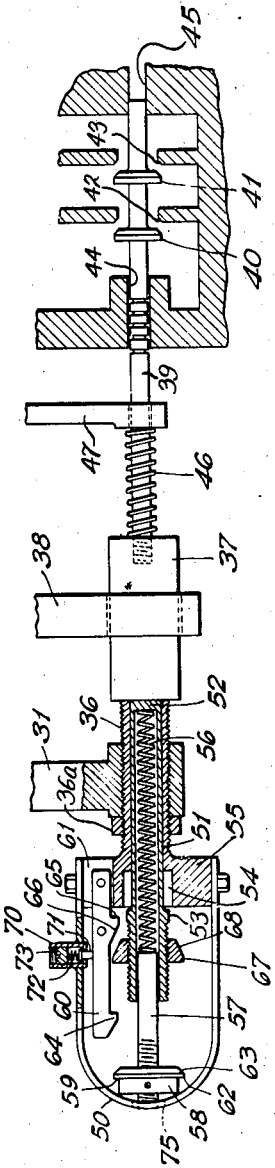
Inventors:
Arnold C. Besserdich
Willard G. Roesch
By Pike H. Sullivan
Attorney Patented Apr. 5, 1949

2,466,358

UNITED STATES PATENT OFFICE 2,466,358

UNDER-SPEED TRIP FOR STEAM TURBINES

Arnold C. Besserdich, Chicago, Ill., and Willard G. Roesch, Hammond, Ind., assignors to Standard Oil Company, Chicago, Ill., a corporation of Indiana Application May 30, 1945, Serial No. 596,794

3 Claims. (Cl. 60—6)

This invention relates to an under-speed trip for motors, and particularly for a stand-by fluid motor or turbine associated with another motor in a dual-driving unit.

In any application where power is supplied to a loaded shaft, and it is essential that the load be maintained fairly constant for continuous periods of time, it is desirable to have a stand-by power source which can operate in case of an emergency to continuously supply power to the load. An example of such an application is frequently found in oil refining processes where the pumps, blowers, and compressors moving the charge, products, etc. through the various operations in a process are preferably powered by an electric motor, and where for emergency purposes there is preferably provided a stand-by steam turbine. This turbine drives the same shaft as the motor and can be brought into use when for any reason the electric power to the motor is cut off or the motor otherwise fails. In such applications it is desirable that a change-over from electric power to steam power be made without a slowing down of the pump, since sudden changes in quantity of the materials being pumped may create a dangerous condition in the process. In present installations if, while the motor is supplying the power for the pump, the throttle valve of the steam turbine is to be closed, the governor of the turbine would have to be so set that the turbine would not operate at the desired speed, when it is called upon to handle the load. To drive at the speed required, therefore, some adjustment must be made after the turbine is brought into use. Often an operator is not available to make this adjustment immediately after electric power or motor failure, and consequently the pump may be operating for a considerable period of time at very much lower speeds, and hence lower capacity than is desirable. A partial remedy for this condition has been to maintain the turbine with a partially open throttle or governor valve at all times, but this is obviously very inefficient since the turbine is driving the shaft at only a portion of its full load. Furthermore, when called upon to take the entire load the turbine speed would still be below the value desired.

It is an object of this invention to provide in a dual-driving unit, a stand-by motor, preferably a fluid turbine, whose speed is so governed that immediately upon failure of the primary motor as for example because of failure of the power supply, it will receive sufficient energy from steam, gas, electricity, etc. to maintain the speed of the load at substantially the same value maintained by the primary motor.

It is a further object to provide a governor of a stand-by motor, such as a steam turbine with an under-speed trip which will operate to prevent the stand-by motor from falling below a predetermined minimum speed, when it is suddenly called upon to drive a load at a desired speed.

A further object of this invention is to provide an underspeed trip which is extremely simple in design and can be readily adapted to steam turbine governors and particularly of the type wherein a pivoted lever translates movement of the speed responsive means in a governor to a spring-loaded governor valve, and further that such trip be adapted to be carried by such lever. Further objects and advantages will be apparent from the following description of our invention:

By this invention we have provided an underspeed trip for a governor of a motor, such as a steam turbine which will normally bias the throttle to a closed or "off" position when the motor is being rotated or driven by another power source at a desired speed along with a loaded shaft, and which may be instantly tripped when the speed of the motor decreases to permit opening of the throttle to the normal position determined by the governor setting for regaining the desired speed at which the load shaft is to be driven. This under-speed trip briefly comprises a collapsible member between a spring-loaded throttle and the speed responsive element of the governor, which collapsible member operates to hold the throttle in its closed position until such a time as the speed responsive means indicates a slowing down of the motor. When this occurs, a trigger action permits the collapse of the collapsible member which allows the spring-loaded throttle to open to the normal position determined by the normal operation of the governor.

Our invention will better be understood by referring to the attached drawings, forming a part of this specification, and wherein like numerals are used to indicate the same parts in the various figures, and wherein Figure 1 is a diagrammatic view of a motor and turbine dual-driving unit, the turbine having a governor with an under-speed trip of our invention.

Figure 3 is a fragmentary diagrammatic view partially in section showing the position of the governor valve and under-speed trip when the turbine is not operating.

Figure 4 is a view similar to Figure 3 when the turbine is operating.

Figure 1:
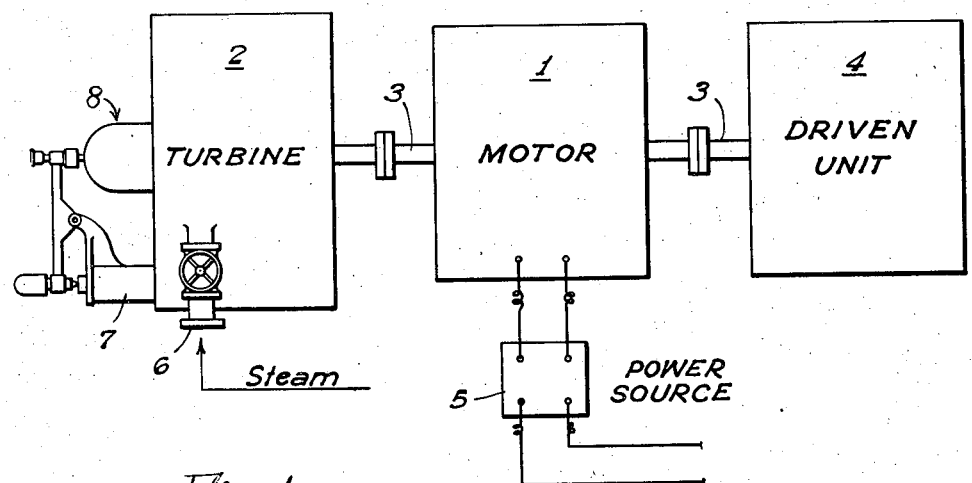
Figure 2:
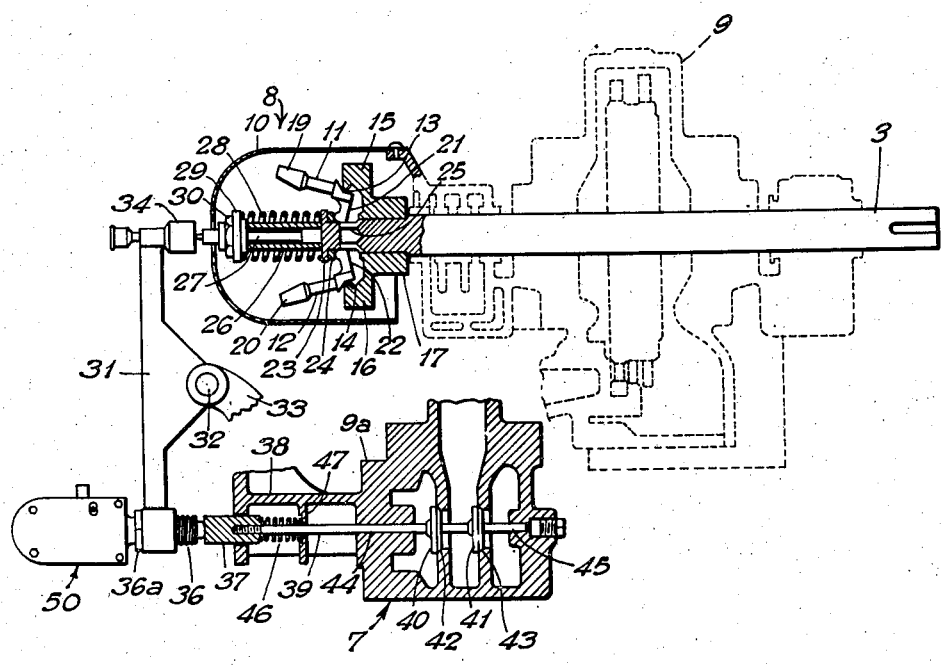
Figure 2 is a diagrammatic plan view of the turbine of Figure 1, partially in section showing specifically the governor assembly.

A turbine and motor dual-driving system having a motor 1 and a turbine 2, driving through a shaft 3 is arranged to drive a unit such as a pump 4, which pump may be handling various types of products, and in an oil refining process, such products as gasoline, crude oil, or any hydrocarbon liquid or vapor. The motor may be electric and supplied with electrical energy from a variable power source 5 so that various speeds may be obtained, depending upon the desired output of the pump or other load. In normal operation the electric motor drives the pump, and the turbine freely rotates, carrying no part of the load. The inlet 6 of the steam or other fluid which drives the turbine is closed off by a valve 7. In the event of an emergency, wherein the electric motor fails to carry the load, the valve immediately opens and the turbine takes up the load and continues driving the pump at the same desired speed so that there is no interruption in its operation. This switch-over from the motor to the turbine is accomplished by means of a governor 8 which is mounted on the steam turbine housing 9 and adapted to control the operation of the valve 7.

This governor may be of various designs but preferably comprises a speed responsive means acting through lever means to control a spring loaded throttle valve. The speed responsive means is contained within a housing 10 and comprises a pair of bell cranks 11 and 12, positioned in abutment with a pair of knife edges 13 and 14, mounted on brackets 15 and 16, extending from a collar 17, which is suitably mounted on the turbine shaft 3 and keyed thereto. The bell cranks have at one end governor weights 19 and 20, which are adapted to swing inwardly and outwardly under the influence of centrifugal force. On each of the arms 21 and 22 of the bell cranks opposite the weights are provided cam surfaces which abut a follower plate 23, slidably mounted by retaining ring 24 in a slot 25 in guide tube 26 which is attached to the end of the turbine shaft. The knife edges and the follower plate cooperate to maintain the bell cranks in proper assembly. Secured to the follower plate and extending through the guide tube is a shaft 27 and surrounding the guide tube and normally urging the follower plate into resilient contact with the cam surfaces is a spring 28. The spring is secured at one end by an adjustable retaining nut 29, threadedly mounted on the outside surface of the guide sleeve. This nut serves as an adjustment for the compression on the spring. A lock nut 30 is provided to secure the adjustment of the retaining nut 29. It is readily seen that by this arrangement the shaft 27 will move longitudinally in response to the inwardly and outwardly movements of the weights.

Connecting the speed responsive means with the valve 7 is a lever 31, pivotably mounted at 32 to a bracket 33 on the inlet valve housing 9a. The one end of the lever carries an abutment 34 which contacts the shaft 27. In the other end of the lever is a threaded hole in which is threaded an adjusting screw 36. It is provided with a lock nut 36a for maintaining its setting. The screw normally abuts a block 37 slidably supported in a hole in the lower portion of a bracket 38 on the inlet housing 9a of the turbine. The block 37 threadedly receives the stem 39 of the valve 7.

The valve is of the double-seated type having a pair of heads 40 and 41 adapted to engage the valve seats 42 and 43 in the walls of the inlet housing. The stem 39 is mounted in slide-ways 44 and 45. The valve is spring-loaded by a helical spring 46 surrounding the stem and fixed at one end to a partition 47 within a hollow portion of the bracket 38 and abuts the block 37 at the other. By so spring-loading the valve, it is biased toward open position and the lever 31 is thus kept in tight abutment with the shaft 27.

Located at the end of the lever 31 and assembled with the adjusting screw 36 is the underspeed trip. It is essentially a collapsible member contained within a shell 50 and comprising a tubular plunger or pin 51 slidably positioned in a hole drilled axially through the adjusting screw 36. The pin is closed at one end by a plug 52 and has formed at the other an enlarged section 53. The enlarged section slides within a counterbore 54 in the head 55 of the adjusting screw.

Within the pin is a helical spring 56 of greater compressive strength than valve spring 46 and a plunger 57 adapted to slidably engage the inner walls of the pin. This plunger is threaded on its outer end for adjustably retaining a circular nut 58. The circular nut has an annular marginal projection 59 which is adapted to be engaged by a stop, such as, an arm 60, pivotably mounted within a radial slot 61 in the head 55 of the screw 36. One of the sides 62 of the projection 59 is in a radial plane while the other 63 is inclined, and a projection 64 on the arm 60 engages the radial side when serving as a stop. A second projection 65 on the inner edge of the arm 60 has an inclined surface 66 which is adapted to be engaged by a second circular nut 67 threadedly mounted on the enlarged section 53 of the pin, and having its peripheral surface 68 similarly inclined to the surface 66.

In order to bias the pivoted arm 60 inwardly, there is a hollow tubular member 70 mounted in the shell 50. Within the member 70 is a plunger 71 loaded by a spring 72 which is held by a set screw 73 threaded in the upper end of the tube.

In operation the pin 51 assembled with nut 67 and plunger 57 assembled with nut 58 are inserted into the adjusting screw 36 and the assembled unit is pushed forward by any suitable means inserted within the shell 50 through a hole 75 until the projection 64 of arm 60 snaps behind projection 59 of nut 58 under the pressure of the bias spring 72. The pin 51 will be urged forward by the spring 56 which, as described above, is of greater strength than the spring 46 and will project beyond the nose of the screw forming a collapsible or retractable extension of the screw (Figure 3). The forwardmost position of the pin 51 in operation is determined by its abutment with the sliding block 37 on the end of the valve stem 39, and this in turn by the closed position of the valve. When in this position a sufficient gap is left between the enlarged section 53 and the bottom of the counterbore 54 to permit forward travel of the pin. When now the lever 31 moves in the direction indicated by the arrow because the speed responsive means indicates a slowing down of the turbine due to a failure of the motor or the power supply the adjusting screw 36 will move with the lever 31 and relative to the pin 51 which will be urged forward by the spring 56 against the weaker opposition of spring 46. This relative movement will cause the inclined surface 66 of the projection 65 to slide over the surface 68 of the nut 67, thus raising the arm 60 until the projection 64 acting as a trigger disengages the projection 59. Upon this disengagement by the trigger action the plunger and pin assembly will instantly retract under the pressure of the spring 56 and the spring 46 of valve 7 until the nut 58 abuts the shell 50 (Figure 4). In this position the block 37 will now abut the end of the adjusting screw 36, thus opening the valve to a position determined by the normal operation of the governor, as determined by the speed responsive means acting on lever 31 and the position of the adjusting screw 36. This position will be substantially that at which the turbine will operate at the desired speed, and only a momentary loss of speed need be experienced since the speed responsive means and lever 31 may be set to move only slightly in order to trip the device.

It should be understood that our under-speed trip may take various other forms than the preferred embodiment described above. As a collapsible member we mean to include any device which may assume an extended position and upon action of a trip revert to a normal position until reset. Further, the trigger or trip action could be provided by means other than the inclined surface, as for example, by any instantaneously acting device whether actuated mechanically, magnetically, or otherwise. Furthermore, it is intended that our underspeed trip be used with governors for various types of stand-by motors other than steam turbines as for example, gas engines, electric motors, hydraulic devices, etc.

The above described embodiment is given by way of example and it is understood that many others will occur to those skilled in the art; therefore, no limitations are intended thereby except as are contained in the following claims.

We claim:

1. In a turbine and motor dual-driving system a motor, a turbine, a loaded shaft adapted to be driven by said motor and said turbine, means for energizing said motor and means for supplying fluid to said turbine, a governor system comprising a spring-loaded governor valve for regulating the amount of fluid to be supplied, a speed responsive means connected to said loaded shaft and means including a lever associated with said speed responsive means and said spring-loaded valve adapted to permit movement of said valve in response to variations in the speed of the shaft, and an underspeed trip carried by said last-named means and adapted to bias said spring-loaded valve to a closed position when the motor is driving the shaft, and to release said valve the instant the motor ceases to drive the shaft faster than a predetermined speed, thus permitting sudden opening of said valve, said under-speed trip comprising a tubular member supported by said lever, two coacting plungers, slidably carried within said tubular member, a spring separating said plungers, stop means for limiting the movement of one of said plungers when said spring-loaded valve is biased to closed position and trigger means adapted to move said stop means so as to render it inoperable and thus permit a release of said valve, said trigger means being operatively associated with said speed responsive means.

2. In a turbine and motor dual-driving system, a motor, a loaded shaft adapted to be driven by said motor and said turbine, means for energizing said motor and means for supplying fluid to said turbine, unitary speed controlling and power changeover means comprising: a spring-loaded governor valve for regulating the amount of fluid to be delivered to said turbine, a governor operatively connected to said loaded shaft for controlling the governor valve, communicator means actuated by said governor and arranged to effect movement of the governor valve correspondingly responsive to variations in shaft speed; and an underspeed trip controlled by said communicator means and operative to retain said spring-loaded valve in a closed position when the motor is driving the shaft and to release said valve the instant the motor ceases to drive the shaft faster than a predetermined speed, thus permitting sudden opening of said valve, the said under-speed trip comprising a member disposed in firm resiliently held abutment against the said spring-loaded valve, stop means for limiting the movement of the aforesaid member when said spring-loaded valve is held in closed position, and trigger means actuated by said communicator means and adapted to move said stop means so as to render it inoperable and thus permit a sudden release of said valve.

3. In a turbine and motor dual-driving system, a motor, a turbine, a loaded shaft adapted to be driven by said motor and said turbine, means for energizing said motor and means for supplying fluid to said turbine, a unitary speed controlling and power changeover means comprising: a spring-loaded governor valve for regulating the amount of fluid to be delivered to said turbine, a governor operatively connected to said loaded shaft for controlling the governor valve, communicator means actuated by said governor and arranged to effect movement of the governor valve correspondingly responsive to variations in shaft speed; an under-speed trip controlled by said communicator means and adapted to bias said spring-loaded valve to a closed position when the motor is driving the shaft, and to release said valve the instant the motor ceases to drive the shaft faster than a predetermined speed, thus permitting sudden opening of said valve, said under-speed trip comprising a tubular member movable in response to the movements of the said governor transmitted by said communicator means, two coacting plungers slidably carried within said tubular member, a spring separating said plungers, stop means for limiting the movement of one of said plungers when said spring-loaded valve is biased to a closed position, and trigger means adapted to move said stop means so as to render it inoperable and thus permit release of said valve, said trigger means being operatively associated with said speed responsive means.

ARNOLD C. BESSERDICH.
WILLARD G. ROESCH.

REFERENCES CITED

The following references are of record in the file of this patent:

UNITED STATES PATENTS

| Number | Name | Date |
|---|---|---|
| 1,259,307 | Snow | Mar. 12, 1918 |
| 1,554,093 | Hösel | Sept. 15, 1925 |
| 1,795,447 | Schmid | Mar. 10, 1931 |

FOREIGN PATENTS

| Number | Country | Date |
|---|---|---|
| 620,512 | Germany | Oct. 23, 1935 |